United States Patent [19]

Lane, Jr. et al.

[11] Patent Number: 4,906,797
[45] Date of Patent: Mar. 6, 1990

[54] LIQUID DICYCLOPENTADIENE FEEDSTOCK FOR BULK POLYMERIZATION

[75] Inventors: Parley C. Lane, Jr., Cuyahoga Falls; George M. Benedikt, Macedonia; Linwood P. Tenney, Hudson; Paul T. Stricharczuk, Twinsburg, all of Ohio

[73] Assignee: The B.F. Goodrich Company, Akron, Ohio

[21] Appl. No.: 242,975

[22] Filed: Sep. 12, 1988

[51] Int. Cl.$^4$ .............................................. C07C 7/20
[52] U.S. Cl. ........................................ 585/1; 585/12; 585/22; 585/362
[58] Field of Search .................. 585/1, 12, 22, 362

[56] References Cited

U.S. PATENT DOCUMENTS

| | | |
|---|---|---|
| 1,720,929 | 7/1929 | Staudinger et al. . |
| 2,721,189 | 10/1955 | Anderson et al. . |
| 2,831,037 | 4/1958 | Schmerling . |
| 2,932,630 | 4/1960 | Robinson et al. . |
| 3,074,918 | 1/1963 | Elenterio . |
| 3,084,147 | 4/1963 | Wilks . |
| 3,367,924 | 2/1968 | Rinehart . |
| 3,467,633 | 9/1969 | Harris et al. . |
| 3,557,079 | 1/1971 | Vergne et al. . |
| 3,701,812 | 10/1972 | Gebhart et al. . |
| 3,790,545 | 2/1974 | Minchak . |
| 3,836,593 | 9/1974 | Streck et al. . |
| 3,853,830 | 12/1974 | Minchak . |
| 3,879,343 | 4/1975 | DeBrunner et al. . |
| 4,002,815 | 1/1977 | Minchak . |
| 4,020,021 | 4/1977 | Lahouste et al. . |
| 4,136,247 | 1/1979 | Tenney et al. . |
| 4,136,248 | 1/1979 | Tenney . |
| 4,136,249 | 1/1979 | Tenney et al. . |
| 4,138,419 | 2/1979 | Arakawa et al. . |
| 4,168,282 | 9/1979 | Schneider . |
| 4,178,424 | 12/1979 | Tenney et al. . |
| 4,239,874 | 12/1980 | Ofstead et al. . |
| 4,250,063 | 2/1981 | Kotani et al. . |
| 4,320,239 | 3/1982 | Schneider . |
| 4,357,449 | 11/1982 | Yi . |
| 4,380,617 | 4/1983 | Minchak et al. . |
| 4,400,340 | 8/1983 | Klosiewicz . |
| 4,426,502 | 1/1984 | Minchak . |
| 4,490,498 | 12/1984 | Yokota et al. . |
| 4,568,660 | 2/1986 | Klosiewicz . |
| 4,584,425 | 4/1986 | Tom . |
| 4,598,102 | 7/1986 | Leach . |
| 4,689,380 | 8/1987 | Nahm . |
| 4,696,985 | 9/1987 | Martin . |
| 4,699,963 | 10/1987 | Klosiewicz . |
| 4,701,510 | 10/1987 | Minchak et al. . |
| 4,703,098 | 10/1987 | Matlack . |
| 4,708,969 | 11/1987 | Leach . |
| 4,748,216 | 5/1988 | Tom . |
| 4,751,337 | 6/1988 | Espy et al. . |

FOREIGN PATENT DOCUMENTS 0181640 5/1986 European Pat. Off. .

OTHER PUBLICATIONS

Chem. Abs., 108:205766z.

Primary Examiner—Curtis R. Davis
Attorney, Agent, or Firm—Robbins and Laramie

[57] ABSTRACT

Liquid dicyclopentadiene feedstocks are provided for bulk polymerization by the addition of reactive norbornene function containing cycloolefin monomers to solid, high purity dicyclopentadiene compositions. These liquid dicyclopentadiene feedstocks provide a high degree of conversion to polymer under bulk polymerization conditions.

5 Claims, No Drawings

LIQUID DICYCLOPENTADIENE FEEDSTOCK FOR BULK POLYMERIZATION

FIELD OF THE INVENTION

This invention is directed to a method for providing a liquid dicyclopentadiene feedstock for bulk polymerization reactions. More particularly, this invention is directed to providing feedstocks of dicyclopentadiene mixed with a reactive cycloolefin monomer to provide a liquid at ambient temperature. These feedstocks are of high purity so as to provide a high degree of conversion when reacting the monomers by ring-opening bulk polymerization. The feedstocks of dicyclopentadiene provided herein are well suited for reaction injection molding, resin transfer molding and other commercial bulk-polymerization techniques.

BACKGROUND OF THE INVENTION

Polymers obtained by a ring-opening polymerization of cycloolefins that contain the norbornene moiety are well known. For example, U.S. Pat. Nos. 4,136,249; 4,178,424; 4,136,247 and 4,136,248, assigned to the same assignee as the present invention, describe such polymers and each is incorporated herein by reference for the description of polymers therein.

Ring-opening polymerization of cycloolefins yields unsaturated linear polymers which are a particular interest in that they are known to be reactive (sulphurvulcanizable) and with difunctional monomers, branching and cross-linking can occur. They are known to exhibit attractive property profiles for many polymer applications, such as, for example, as automotive parts, particularly decorative trim.

The ring-opening polymerization reaction has been found to be sufficiently rapid to be amenable to bulk polymerization techniques such as, for example, reaction injection molding and reagent transfer molding. Minchak in U.S. Pat. No. 4,426,502, discloses a bulk polymerization process for "norbornene-type monomers" which include norbornene, dicyclopentadiene, tricyclopentadiene (cyclopentadiene trimer), tetracyclododecene and other cycloolefin monomers containing a norbornene functional group. Bulk polymerization processes provide the advantage of synthesizing polymers in a mold in the final shape desired so that no further melt processing is required. Therefore, high molecular weight polymers with high glass transition temperatures can be synthesized without concern for the need of extreme process conditions to process these polymers into finished articles.

Dicyclopentadiene is a common cycloolefin monomer used to prepare ring-opened polymerized polymers in that it is readily available as a by-product in ethylene production. Dicyclopentadiene is a suitable monomer for bulk polymerization techniques, as disclosed by Minchak in U.S. Pat. No. 4,426,502. For such bulk polymerizations, liquid reagents are preferred in that they are handled easily in solids, provided they are not too viscous.

Rapid mixing is a desired feature for bulk polymerizations of cycloolefin monomers in that the reaction generally proceeds in the presence of a two component catalyst/cocatalyst system. At least one component remains isolated from the monomers until polymerization is desired. Once a complete catalyst/cocatalyst system is dissolved within such monomers, ring-opening polymerization occurs. The reaction rate may be enhanced by increasing the temperature of the reacted mixture. A common procedure is to combine the catalyst components in two separate volumes of cycloolefin monomer and mix these two volumes prior to injection into a mold. Such a technique typically commands the use of monomer in liquid form.

Problems arise with the use of dicyclopentadiene in that it is a solid at ambient temperature when sufficiently pure for use in bulk polymerization reactions. The melting point for high purity dicyclopentadiene is generally above about 31° to 32° C. Although dicyclopentadiene can be rendered liquid with slight heating, this high melting temperature presents a significant disadvantage in commercial processes. For example, in a continuous system, feedlines for monomer must be heated to prevent solidification of the dicyclopentadiene. In addition, when shipping the monomer, considerable trouble and expense is realized in melting the monomers when they arrive at their destination for use in polymerization processes.

The technique of melting point/freezing point depression of a pure composition by the addition of one or more soluble components is well known. However, high purity dicyclopentadiene has been found to be necessary for bulk polymerization processes to obtain useful products. Impurities will often provide liquid dicyclopentadiene mixtures but will also retard polymerization. Adding an inert solvent or diluent will adversely affect the products obtained in that the unreacted component will reduce impact properties and/or leach from the finished article, rendering it useless. It is desirable to identify species which will lower the freezing point of dicyclopentadiene without inhibiting the properties obtained upon ring-opening polymerization in bulk. While additives such as impact modifiers have been commonly used in feedstocks of dicyclopentadiene for ring-opening bulk polymerization, these additives generally do not depress the melting point/freezing point of dicyclopentadiene. In addition, while blends of dicyclopentadiene with other cycloolefin monomers have been described as suitable for use in bulk polymerization reactions by Minchak in U.S. Pat. Nos. 4,380,617 and 4,426,502, methods which efficiently reduce the melting point/freezing point of dicyclopentadiene without adversely affecting the properties of polymers obtained on bulk polymerization, have not been described. The methods provided by this invention permit high levels of dicyclopentadiene to be used in forming liquid dicyclopentadiene mixtures.

SUMMARY OF THE INVENTION

This invention provides a method for reducing the freezing point of high purity dicyclopentadiene without detracting significantly from its utility in bulk polymerization processes. The process utilizes cycloolefin monomers having a norbornene functional group. These cycloolefin monomers must be soluble within the dicyclopentadiene monomer and must copolymerize with such monomer under bulk polymerization conditions. Preferred cycloolefin monomers include the liquids, ethylidene norbornene and methyl tetracyclododecene. Preferred solid cycloolefin monomers include hexacycloheptadecene and tricyclopentadienes (or cyclopentadiene trimers).

DETAILED DESCRIPTION OF THE PREFERRED EMBODIMENTS

The methods provided by the present invention produce a cycloolefin monomer feedstock for a ring-opening bulk polymerization reaction which is comprised substantially of dicyclopentadiene. This feedstock of dicyclopentadiene is unique in that it is liquid at ambient temperature yet sufficiently pure so as to provide a high degree of conversion when used in a ring-opening bulk polymerization process, such as reaction injection molding or resin transfer molding.

In addition, the properties of the polymers obtained upon bulk polymerization are not adversely affected by the method of this invention. The degree of conversion provided by this cycloolefin monomer feedstock provides at least a 90% degree of conversion to polymer upon ring-opening bulk polymerization, as determined by thermal gravimetric analysis described below.

The method of this invention contemplates the use of the volume of dicyclopentadiene of sufficient purity so as to exhibit a melting point above ambient temperature, i.e., the dicyclopentadiene is solid at room temperature. Dicyclopentadiene is commercially available at 99% purity and at this grade it has a melting point of 33° C. Low grades of dicyclopentadiene can also be used in this invention where the monomer is a solid. However, small quantities of impurities can render the dicyclopentadiene liquid. If such a volume of liquid dicyclopentadiene is to be used, it should be purified prior to employing the process of this invention. This is desirable not only to achieve the desired objects of the present invention, but also to provide a feedstock of sufficient purity so as to polymerize under bulk polymerization conditions at a high degree of conversion of monomer to polymer. Crude grades of dicyclopentadiene (of about 97%) are commercially available and are generally recognized as needing special treatment prior to use. Small quantities of unpolymerizable impurities present in dicyclopentadiene are a problem in that they generally inhibit or retard polymerization. Such impurities should be removed or incorporated within the monomers, rendering them inert. Copending application Ser. No. 179,253, now U.S. Pat. No. 4,843,185, describes a method for enhancing the polymerization activity of crude grade dicyclopentadiene by heat treatment. This heat treatment reacts the cyclopentadiene, from cracked dicyclopentadiene, with alicyclic olefins and acyclic alpha olefinic impurities generating new monomers. Such a heat treatment process can be used to generate a sufficient number of new monomers to reduce the melting point of the dicyclopentadiene mixture while increasing the % of polymerizable monomers.

In performing the process of this invention, a reactive cycloolefin monomer, other than dicyclopentadiene, is incorporated within the volume of dicyclopentadiene. This reactive cycloolefin monomer must be soluble in dicyclopentadiene to form a dicyclopentadiene solution. The solubility of such monomer must be sufficiently high to reduce the melting point of dicyclopentadiene below ambient temperature where less than 15% by weight, based on the weight of dicyclopentadiene, is introduced. To achieve the objective of the present invention, the minimum quantity of reactive cycloolefin monomer introduced is that which does in fact reduce the melting point of dicyclopentadiene below ambient temperature.

Reactive cycloolefin monomers which can be used in the present invention are characterized by the presence of at least one norbornene group represented by the formula I below, which is substituted with alkyl, alkylene, alkylidenyl, cycloalkyl, aryl groups, alkaryl groups, cycloalkenyl, and alkadienyl groups.

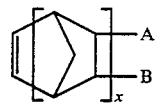

The substituent groups that are preferred are those which enhance the reactivity of the norbornene groups to the extent to which the cyclopentene group of dicyclopentadiene does. It is desirable for the reactive cycloolefin monomer to have a reactivity which equals or exceeds that of dicyclopentadiene so that these components do not remain unreacted in the finished bulk polymerization product. Suitable substituents for A and B are alkyl, alkylene, alkylidenyl, cycloalkyl, cycloalkylene and aryl groups. Reactive cycloolefin monomers can have x equal to from 1 to 5 and A and B independently selected from $C_1$ to $C_4$ alkyl, $C_2$ to $C_4$ alkylene groups, $C_1$ to $C_5$ alkylidenyl, $C_6$ to $C_{12}$ cycloalkyl groups, $C_6$ to $C_{12}$ cycloalkylene groups, and $C_6$ to $C_{12}$ aryl including aryl-alkyl groups and where x is 1 or more, A and B can together form saturated or unsaturated cyclic groups of from 4 to 12 carbon atoms with the two ring carbon atoms connected thereto, said ring carbon atoms forming part of and contributing to the 4 to 12 carbon atoms in the cyclic group. A and B together may also form a double bond such as in norbornadiene, and a norbornene structure, such as Formula II below.

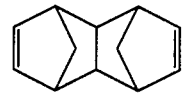

The preferred reactive cycloolefin monomers are selected from 5-ethylidene-2-norbornene, methyl tetracyclododecene, norbornadiene, tricyclopentadiene (or cyclopentadiene trimer) and hexacycloheptadecene (or decahydrotrimethanoanthracene).

The conventional method for incorporating these reactive cycloolefin monomers into the dicyclopentadiene solution is to add them directly and mix these components to form a solution. An alternative method is available where it is desirable to introduce tricyclopentadiene and other oligomeric monomers as a reactive monomer. Tricyclopentadiene and higher molecular weight monomers can be generated in situ by reaction of cyclopentadiene with dicyclopentadiene. The cyclopentadiene is generated by dissociation of the dicyclopentadiene upon the application of heat. This heat treatment process will generate a small quantity of cyclopentadiene. This will also have an effect on reducing the melting point of the dicyclopentadiene solution. However, cyclopentadiene is not a particularly desirable component in that it may not incorporate into the bulk polymerized polymer. Methods for heat treating dicyclopentadiene to generate trimers and tetramers of cyclopentadiene are described in copending U.S. application Ser. No. 122,849. By generating the species in situ, a 99% solution of dicyclopentadiene will become liquid at temperatures below ambient temperature.

It is preferable to use less than 15% by weight of the reactive cycloolefin monomer so as not to detract from the properties of the polymers obtained from dicyclopentadiene. Certain monomers such as ethylidene norbornene have a dramatic effect on the melting point of the dicyclopentadiene solution in small quantities when such quantities are based on the weight of the reactive cycloolefin monomer. These lower molecular weight reactive monomers suffer the disadvantage that they can depress the heat distortion temperature or glass transition temperature of the polymer produced upon bulk polymerization if used in quantities above 15% by weight of the dicyclopentadiene concentration.

Species having a higher molecular weight than dicyclopentadiene generally do not have a deleterious effect on the heat distortion temperatures of the polymers obtained. However, a given weight concentration of such reactive cycloolefin monomer does not depress the melting point of the dicyclopentadiene solution to the same extent as ethylidene norbornene. Therefore, it may be more expensive to reduce the melting point to a desired level when using high molecular weight species since a corresponding amount of higher molecular weight species would be required.

Quantities of reactive cycloolefin monomer in the dicyclopentadiene which are most preferred generally fall below about 10% by weight of the dicyclopentadiene. At such concentrations, the cycloolefin feedstock provides copolymers with the same characteristics of dicyclopentadiene polymers. Generally the costs in providing this feedstock are not affected by the low quantities of reactive cycloolefin monomer.

As indicated above, the general objective of the present invention is to provide a dicyclopentadiene feedstock which is liquid at ambient temperature. In preferred embodiments, the melting point/freezing point of the dicyclopentadiene solution is reduced below 0° C. This will permit greater flexibility in transportation and storage. Ethylidene norbornene will generally provide a melting point below 0° C. utilizing quantities less than 10 weight percent of the dicyclopentadiene as will methyl tetracyclododecene.

In introducing reactive cycloolefin monomers, it is important that the concentration of impurities and inert components within the dicyclopentadiene solution obtained is sufficiently low so that a high degree of conversion is obtained when utilizing this solution as a feedstock in a bulk polymerization reaction. The dicyclopentadiene solution should provide at least a 90% degree of conversion of the monomers therein to polymer when used in a bulk polymerization process. This 90% degree of conversion is a value determined by thermal gravimetric analysis wherein a polymerized sample is heated in a DuPont 1090 Thermal Analyzer and heated up to 400° C. The weight loss of the polymerized sample is determined as a weight of unreacted monomer, thus the remaining portion is regarded as converted polymer. Where an impact modifier is introduced, weight loss attributed to its degradation is accounted for by monitoring the weight loss as the sample is heated. Preferably, the dicyclopentadiene solution will provide at least a 97% degree of conversion of the monomers therein. These dicyclopentadiene solutions can be mixed with other components so as to complete the feedstock for a reaction injection molding process or a reaction transfer molding process. These components would include catalysts, catalyst activator, catalyst modifier, flame retardants, pigments, antioxidants, impact modifier fillers and the like. As is generally known in the art, these additives should not deactivate the catalysts used in the bulk polymerization reaction.

The following examples are provided to better illustrate the invention. It should be recognized that this invention includes embodiments which are not shown with the particularity of those below. The following examples are representative of the full scope of the present invention.

EXAMPLE 1

Less than 10 grams of high purity (99%) dicyclopentadiene obtained from Exxon Corp. were used to formulate the mixtures of Example 1. The dicyclopentadiene exhibited a melting point of about 33° C. The dicyclopentadiene was mixed with methyl tetracyclododecene having a melting point of about −40° C. to −42° C. at ambient temperature.

Five different dicyclopentadiene solutions were obtained and are identified below as formulations A–E. Once these solutions were blended at ambient temperature, they were cooled to form a solid and their freezing point/melting point was measured with a common laboratory thermometer. The results of the melting point determinations are indicated below in Table 1. It is noted that formulations D and E did not freeze to a solid at −78° C. and a melting point was not determined.

TABLE 1

| Formulation | DCPD (weight %) | MTD (weight %) | Melting Point (°C.) |
|---|---|---|---|
| A | 92.1 | 7.9 | 0/−3 |
| B | 85 | 15 | −18/−20 |
| C | 78 | 21 | −38/−41 |
| D | 73.4 | 26.6 | below −78 |
| E | 63.8 | 36.2 | below −78 |

DCPD = dicyclopentadiene
MTD = methyl tetracyclododecene

The above examples illustrate that methyl tetracyclododecene is effective in producing the melting point of dicyclopentadiene below ambient temperature in relatively small quantities, i.e., below about 10 weight percent of the dicyclopentadiene.

Solution Reactivity

To demonstrate the reactivity of solutions obtained from dicyclopentadiene and methyl tetracyclododecene, a feedstock was prepared with 95 weight percent dicyclopentadiene and 5 weight percent methyl tetracyclododecene for bulk polymerization. To 84.3 g of monomer components were added the following ingredients in order:
(1) 1.0 g 50/50 Ethyl 702/Mark 1178 antioxidants
(2) 2.5 g Kraton G1652
(3) 1.5 ml 1M n-propanol
(4) 3.0 ml 0.5M diethyl aluminum chloride catalyst solution (90/10 DCPD/ENB)
(5) 2.0 ml 0.25M $SiCl_4$ (90/10 DCPD/ENB)
(6) 5.0 ml 0.1N $[(C_{12}H_{25})_3NH]_4Mo_8O_{26}$ solution (90/10 DCPD/ENB)

The above ingredients were mixed under a nitrogen blanket and injected into a mold after impingement mixing. The placques obtained were analyzed by thermal gravimetric analysis to determine the degree of conversion. A duPont 1090 thermal analyzer was used while increasing the temperature up to 400° C. The weight loss of the sample indicated a 97% conversion was obtained. The heat distortion temperature of the product was about 114° C. and the solvent resistance was found to be comparable to polydicyclopentadiene.

EXAMPLE 2

Less than 10 gms of dicyclopentadiene at 99% purity was mixed with ethylidene norbornene in a manner as described in Example 1. The dicyclopentadiene was also as described in Example 1, having been obtained from Exxon Corp. The ethylidene norbornene was obtained from Union Carbide. Mixing took place at ambient temperature. Ethylidene norbornene was added in quantities ranging from 2.8 weight percent to 2.9 weight percent, based on the weight of the total composition. Melting points for the solutions obtained were measured as described in Example 1. The melting points and quantities of ethylidene norbornene added are indicated below in Table 2.

TABLE 2

| Formulation | DCPD (weight %) | ENB (weight %) | M.P. (°C.) |
|---|---|---|---|
| F | 97.2 | 2.8 | +20 |
| G | 91.8 | 8.2 | −7/−9 |
| H | 87.1 | 12.9 | −28/−31 |

DCPD = dicyclopentadiene
ENB = ethylidene norbornene
M.P. = melting point

The above formulations demonstrate that ethylidene norbornene is more efficient in reducing the melting point of dicyclopentadiene than methyl tetracyclododecene. Quantities of about 12.9% by weight reduce the melting point to below about −28° C. where ethylidene norbornene was used. For methyl tetracyclododecene (MTD), quantities of 15% by weight MTD reduced the melting point to about −20° C. The use of ethylidene norbornene represents a cost effective method for providing liquid dicyclopentadiene solutions at ambient temperature.

Reactive Solutions

A reactive formulation comprised of about 161 gms of a 90/10 DCPD/ENB solution was prepared by adding the following components for a small scale bulk polymerization process:
(1) 4 g Mark 2112 antioxidant
(2) 5 g Diene 55 elastomer
(3) 4 ml 1M n-propanol
(4) 8 ml 0.5M diethyl aluminum chloride catalyst solution (90/10 DCPD/ENB)
(5) 8 ml 0.25M SiCl4 (90/10 DCPD/ENB)
(6) 10.0 ml 0.1N [(C12H25)3NH]4Mo8O26 solution (90/10 DCPD/ENB)

These ingredients were added sequentially with a trialkyl ammonium molybdate catalyst being added last. All were added to clean, dry bottles at room temperature and put under a nitrogen blanket. The bottle was fitted with a pouring spout and the contents were transferred into a cavity mold of about ⅛"×8"×8" held at about 70° C. A thermo-couple was inserted into the mold to monitor the temperature. After the exotherm (usually after about 1.5 to 3 minutes), the temperature dropped down to the mold temperature (about 60° C.) and the mold was opened and the placque removed. To determine percent conversion by thermal gravimetric analysis, a duPont 1090 thermal analyzer was used using the weight loss up to 400° C. as an indication of the unreacted monomer within the placque. Where a flame retardant is in the formulation, the weight loss just prior to flame retardant decomposition is reported. The placque obtained showed 98.5% conversion of monomer and a heat distortion temperature of about 108° C. The solvent resistance of the polymerized sample was substantially equivalent to poly-dicyclopentadiene.

EXAMPLE 3

About 90 gms of dicyclopentadiene as described in Example 1 was added to 10 gms of solid hexacycloheptadecene at ambient temperature and melted to form a dicyclopentadiene solution. The melting point was determined by a procedure described in Example 1 and found to fall within the range of about −1° C. to 0° C.

EXAMPLE 4

For this example 99% dicyclopentadiene as described in Example 1 was heated at about 150° C. under a nitrogen blanket to cause dissociation of dicyclopentadiene and the formation of higher molecular weight oligomers of dicyclopentadiene. Three different samples of dicyclopentadiene were heated for 2 hours, 4 hours and 6 hours. The heated solutions were cooled to ambient temperature and all remained liquid at about 20°–25° C. A sample of each of the heated mixtures was analyzed by gas phase chromatography to determine the composition thereof. Another sample was cooled to test for the melting/freezing point of the solution. The method of Example 1 was used. The results from these analyses are reported below in Table 3.

TABLE 3

| Formulation | DCPD (wt %) | TRI-CPD (wt %) | Other (wt %) | M.P. (°C.) |
|---|---|---|---|---|
| I | 93.1 | 5.8 | 1.1 | +3/+5 |
| J | 85.0 | 13.5 | 1.5 | −28/−30 |
| K | 76.0 | 21.5 | 2.5 | −38/−40 |

DCPD = dicyclopentadiene
TRI-CPD = tricyclopentadiene
Other = higher oligomers of cyclopentadiene
M.P. = melting point The above formulations show that reactive monomers can be incorporated in the dicyclopentadiene compositions by oligomerization in situ. They need not be introduced as a separate element.

Reactive Solution

About 4 gallons of melted dicyclopentadiene at 99% purity were charged in a 5-gallon autoclave reactor provided with 100 psi steam heated jacket. The reactor contents were nitrogen purged, heated to about 150° C. for about 6 hours and cooled down to room temperature. A gas chromatograph (GC) analysis of the contents showed 76.4% dicyclopentadiene and 22.8% by weight of the higher molecular weight Diels Alder adducts of dicyclopentadiene (about 20.8% tricyclopentadiene and 2.0% tetracyclopentadiene).

About 81.2 gms of this preheated mixture was bulk polymerized as follows: the heated dicyclopentadiene solution was charged into a 7-ounce beverage bottle, previously dried for at least 1 hour at 105° C. and cooled to room temperature under nitrogen purge. The solution remained a liquid at room temperature. About 1.8 ml of a 1 molar solution of n-propanol in a solvent of dicyclopentadiene (DCPD)/5-ethylidene-2-norbornene (ENB) at a 95:5 weight ratio, followed by 4 ml of a 0.5 molar solution of diethyl aluminum chloride in DCPD/ENB at a 95:5 weight ratio followed by 4 ml of a 0.25 molar solution of silicon tetrachloride in DCPD/ENB at a 95:5 weight ratio were then added to the bottle. The bottle head space was evacuated at 10 mm mercury until the formation of gas bubbles ceased. About 5 ml of a 0.0125 molar solution of an amine molybdate having a molecular formula $[(C_{12}H_{25})_3NH]_4Mo_8O_{26}$ in DCPD/ENB at a 95:5 weight ratio was added to the bottle and dispersed rapidly. The bottom was inverted and using nitrogen pressure, liquid contents were transferred to a mold preheated to about 60° C. The temperature of the exotherm that ensued within about 1.5 minutes was about 167° C. After about 5 minutes, the mold was opened and the molded product removed therefrom. The degree of conversion was about 97.6%. The Izod impact strength (264 psi load) at room temperature was about 1.57 ft.lb./in., the glass transition temperature was about 182° C. and the heat distortion temperature was about 140° C. For a similarly polymerized dicyclopentadiene solution which was not heated, the molded part exhibited a glass transition temperature of about 160° C. and a heat distortion temperature of about 111° C. at a 264 psi load. The Izod impact strength for unheated dicyclopentadiene at room temperature was about 1.59 ft.lb./in.

This example demonstrates that polymerizable liquid dicyclopentadiene solutions can also be obtained without the separate addition of a reactive cycloolefin monomer and that species used to depress the melting point of such dicyclopentadiene solutions can be generated in situ and can enhance the physical properties desired of the products produced by bulk polymerization.

While this invention has been disclosed in this patent application by reference to the details of the preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A method for producing a cycloolefin monomer feedstock for a ring-opening bulk polymerization reaction wherein said cycloolefin monomer feedstock is substantially comprised of dicyclopentadiene, is a liquid at ambient temperature and is sufficiently polymerizable so that at least a 97% degree of conversion of monomer to polymer is obtained by a ring-opening, bulk polymerization reaction, as determined by thermal gravimetric analysis, said process comprising:
    (a) providing a volume of dicyclopentadiene of sufficient purity so as to exhibit a melting point above ambient temperature;
    (b) adding to said volume of dicyclopentadiene a monomer selected from the group consisting of 5-ethylidene-2-norbornene, methyl tetracyclododecene, and hexacyclopentadecene (or decahydrotrimethanoorthracene), to form a dicyclopentadiene solution having a melting point below ambient temperature, said monomer being below 25% by weight of the total weight of dicyclopentadiene solution and,
    (c) maintaining the concentration of impurities and inert components within the dicyclopentadiene solution sufficiently low so that at least a 97% degree of conversion of monomers to polymer is obtained, as determined by thermal gravimetric analysis, when used as a feedstock for a ring-opening, bulk polymerization reaction processes.

2. A method as in claim 1 wherein the quantity of reactive cycloolefin monomer incorporated in the volume of dicyclopentadiene falls within the range of about 5 to 15% by weight of the total weight of dicyclopentadiene.

3. A method as in claim 1 wherein the dicyclopentadiene solution has a melting point below 15° C.

4. A method for producing a cycloolefin monomer feedstock for a ring-opening polymerization reaction wherein said cycloolefin monomer feedstock is comprised of at least 85% by weight dicyclopentadiene, has a melting point below 0° C. of conversion of monomer to polymer greater than 97% when reacted by a ring-opening bulk polymerization reaction, as determined by thermal gravimetric analysis, said process comprising:
    (a) providing a volume of dicyclopentadiene of about 97% purity having a melting point above about 30° C.;
    (b) adding to said volume of dicyclopentadiene, a reactive cycloolefin monomer to form a dicyclopentadiene solution, said monomer being selected from the group consisting of 5-ethylidene-2-norbornene, methyltetracyclododecene, tetracyclopentadiene (or cyclopentadiene tetramer), and hexacycloheptadecene (or decahydro-trimethanoanthracene) in a quantity ranging from about 5 to 15% by weight, based on the total weight of dicyclopentadiene; and
    (c) maintaining the mixture of cycloolefin monomers substantially free of impurities and inert components so that at least a 97% degree of conversion of monomer to polymer is obtained, as determined by thermal gravimetric analysis, when used as a feedstock in a ring-opening bulk polymerization reaction.

5. A method for producing a cycloolefin monomer feedstock for a ring-opening bulk polymerization reaction wherein said cycloolefin monomer feedstock is comprised of at least 90% by weight dicyclopentadiene, has a melting point below about 0° C. and contains less than 1% by weight polymerization retarding impurities and inert components, said process comprising:
    (a) providing a solid volume of dicyclopentadiene of 99% purity;
    (b) adding 5-ethylidene-2-norbornene to said solid volume of dicyclopentadiene in a quantity of from about 5 to 10% by weight, based on the total weight of dicyclopentadiene and mixing these two components to form a dicyclopentadiene solution; and
    (c) maintaining less than 1% by weight polymerization retarding impurities and inert components within the dicyclopentadiene solution, based on the total weight of said dicyclopentadiene solution.

* * * * *